United States Patent [19]

Bieri

[11] Patent Number: 5,201,638
[45] Date of Patent: Apr. 13, 1993

[54] HYDRAULIC ENERGY SUPPLY CART
[75] Inventor: Hans Bieri, Pfäffikon, Switzerland
[73] Assignee: Hydrostress AG, Pfäffikon, Switzerland
[21] Appl. No.: 682,139
[22] Filed: Apr. 8, 1991
[30] Foreign Application Priority Data Apr. 10, 1990 [CH] Switzerland ............... 01208/90

[51] Int. Cl.[5] .................... F04B 17/00; F04B 39/06
[52] U.S. Cl. .................... 417/234; 417/360; 417/362; 417/368
[58] Field of Search ............ 417/234, 360, 362, 410, 417/423.15, 62, 368; 418/88

[56] References Cited

U.S. PATENT DOCUMENTS

| 1,049,894 | 1/1913 | Merrill | 417/62 |
| 1,506,652 | 8/1924 | Maker | 417/234 |
| 2,136,117 | 11/1938 | Nichols | 418/88 |
| 2,354,278 | 7/1944 | Robinson . | |
| 4,272,224 | 6/1981 | Kabele | 417/360 |
| 4,601,378 | 7/1986 | Pierce | 417/360 |
| 4,729,722 | 3/1988 | Toth | 417/234 |
| 4,869,641 | 9/1989 | Hufgard | 417/368 |
| 4,923,344 | 5/1990 | Bieri . | |
| 4,932,597 | 6/1990 | Bieri . | |
| 4,964,434 | 10/1990 | Bieri . | |

FOREIGN PATENT DOCUMENTS 2851089 5/1979 Fed. Rep. of Germany .
55-126101 9/1980 Japan .
2114235 8/1983 United Kingdom .

OTHER PUBLICATIONS

768 Engineers' Digest, article in chapter; "Hydraulics", Dec. 1977, vol. 38, No. 12, pp. 15, 17, 19 and 20.

Primary Examiner—Richard A. Bertsch
Assistant Examiner—Roland McAndrews
Attorney, Agent, or Firm—Frishauf, Holtz, Goodman & Woodward

[57] ABSTRACT

To permit at least partial disassembly of a drive motor (2) from a coupled pump system (3) to provide high hydraulic pressure, and separate portability of the motor element and the pump element, a cart, with wheels (4), is provided with a horizontally transversely extending mounting plate (28) on which the motor (22) can seat, with its motor shaft (27) extending vertically. The pump unit (3), which can be formed of two or more high-pressure hydraulic pumps and include a cooling water circulating pump (14), has a vertically extending pump shaft (56). The motor shaft and the pump shaft extend through the mounting plate, and a transmission, preferably a belt transmission, is located below the mounting plate. The belt transmission may include a drive pulley which is hollow in the middle, and formed with an internal gear (33) which engages an external, axially curved gear (14') on the motor drive shaft, to form a separable coupling. The motor can be lifted off the cart, and transported separately.

15 Claims, 4 Drawing Sheets

HYDRAULIC ENERGY SUPPLY CART

Reference to related patents, assigned to the assignee of the present application, by the inventor hereof:
U.S. Pat. No. 4,923,344, Bieri
U.S. Pat. No. 4,964,434, Bieri
U.S. Pat. No. 4,932,597, Bieri.

FIELD OF THE INVENTION.

The present invention relates to a hydraulic energy supply unit which is mobile, that is, located on a cart, which retains in addition to a hydraulic fluid source a motor to drive a hydraulic pump, and which is so arranged and constructed that different operating elements on the cart can be removed easily therefrom, so that the overall energy supply structure can be broken up into portable subunits, and easily reassembled at a specific site where hydraulic pressure fluid is needed.

BACKGROUND

Hydraulic power sources are used more and more to operate power tools, and particularly power tools requiring high pressure. Hydraulic drive motors can be used to energize concrete drills and concrete boring apparatus, concrete saws, and, also, concrete crushers. The referenced U.S. Pat. No. 4,932,597, by the inventor hereof, illustrates a concrete crusher which can be clamped around a concrete wall structure, for example, to crush the wall structure into pieces which can be handled more easily. The referenced U.S. Pat. No. 4,964,434, by the inventor hereof, describes a suitable hydraulic valving system to control hydraulic pressures being applied to hydraulically operated tools; and the referenced U.S. Pat. No. 4,923,344 describes a coupling element, especially adapted for coupling and uncoupling concrete or rock boring or milling tools to a drive source.

The hydraulic power or energy supply apparatus, generating hydraulic pressure, is normally separate from the tools being used, and connected to the tools or apparatus units by high-pressure hoses. Increasing pressure requirements of hydraulically operated tools and units call for larger hydraulic power and pressure supply units or systems. The power supply systems then become large and heavy. If the tools are to be operated, for example, in a multi-level building, transportation of such power supply units to upper floors becomes difficult.

THE INVENTION

It is an object to provide a hydraulic energy or power supply unit which has high hydraulic pressure output and is so constructed that it can be carried in the interior of stairways to upper levels or floors, or can readily be transported in passenger elevators, and which, further, is so small that it can be passed through the door openings of customary and legal size of occupied buildings without requiring any external hoists, cranes, or special external elevator structures.

Briefly, the hydraulic energy supply system is placed on and attachable for support on a movable cart, typically a wheeled cart, and has a hydraulic pump element with a pump shaft extending vertically. An electric drive motor element, preferably a three-phase motor element, has a motor drive shaft, also extending vertically. The two shafts, which are parallel to each other, are connected by a suitable transmission or gearing which is located at the bottom of the cart, and coupled to both of the shafts. The coupling, at least to one of the shafts, is a quick-release coupling, so that the respective element, usually the drive motor, can be readily separated from the gearing. This, then, removes often almost half the weight of the overall system from the cart, to permit separate transportation of the motor. The motor itself, as is customary in apparatus of this type, has usually only a short connecting cable for electrical connection to suitable controls and/or power outlets.

The cart structure permits compact association of the drive motor with the pump, due to the vertical shafts of the drive motors and the pump, so that the overall dimensions of the cart can be held to be so small that it can be transported even over narrow stairways or in passenger elevators. For transport, the overall weight can be reduced by removing the drive motor from the remainder of the cart structure, by merely a few disengagement operations, for separate transport of the motor and the hydraulic elements and, if desired, the gearing or transmission on the cart.

DRAWINGS

DETAILED DESCRIPTION

Figure 1:
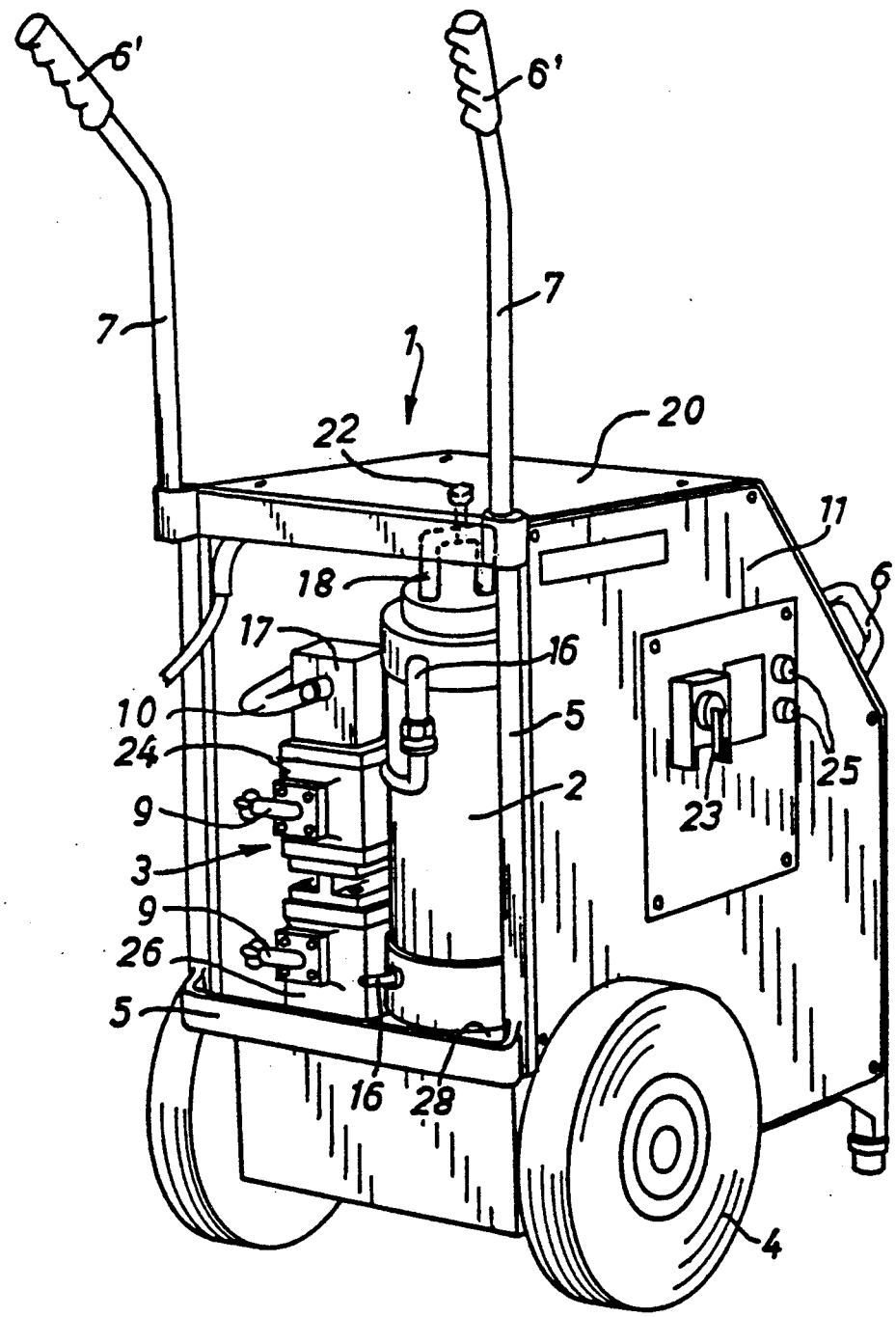
FIG. 1 is a perspective overall view of the hydraulic energy supply cart, and illustrating the major components thereof.

The hydraulic energy and power supply cart 1 (FIG. 1) is constructed with wheels 4 to roll over a surface. It has, as its major components, an electric drive motor 2 and at least one high-pressure pump unit 3, drivingly connected with the motor 2, to generate high hydraulic pressure, suitable for use for example in a concrete crusher as described in the referenced U.S. Pat. No. 4,932,597. The wheels 4 support a chassis 5. The outside of the chassis 5 can be closed or covered by cover sheets 11, 20. The chassis 5, which may include a frame portion, has handles 6 secured thereto so that the chassis 5 can be carried. In addition, support rods 7, removably coupled to the frame of the chassis 5, extend upwardly and terminate in further handles 6'. The energy supply cart 1, besides the motor and pump elements 2, 3, includes all necessary apparatus to operate and control the electrical and hydraulic units therein. It has a switch 23 and indicator elements 25. Connecting couplings 9, 10 for pressure fluid, typically oil, and for cooling water are provided. An oil supply tank likewise is located on the cart. The drive motor 2, preferably, is a water-cooled three-phase electric motor.

In accordance with a feature of the invention, the drive shaft 27 of the motor extends vertically downwardly and terminates in a coupling wheel 14, which is constructed in form of an axially curved gear. Connecting nipples 16 for the cooling water are located on the motor at the upper and lower sides thereof, adapted for coupling to cooling water hoses. The upper side of the motor 2 includes an upwardly extending carrying handle 18 which is attached to the upper panel 20 of the cart by a screw 22.

The high-pressure pump 3 preferably is formed of two coaxially vertically coupled gear pump elements 24, 26. The common pump extends at least approximately in vertical direction. They operate to provide high-pressure hydraulic oil. A further pump 17 is coupled to the pumping units 24, 26 to provide cooling water. The two high-pressure gear pumps 24, 26 for hydraulic fluid are so arranged that they can provide either different through-put of hydraulic fluid or different pressures. A control valve, for example of the type described in the referenced U.S. Pat. No. 4,964,434 can connect either one or the other, or both pumps, in unison, to a hydraulic pressure supply line. Typical hydraulic pressure is, for example, 240 bar.

Figure 2:
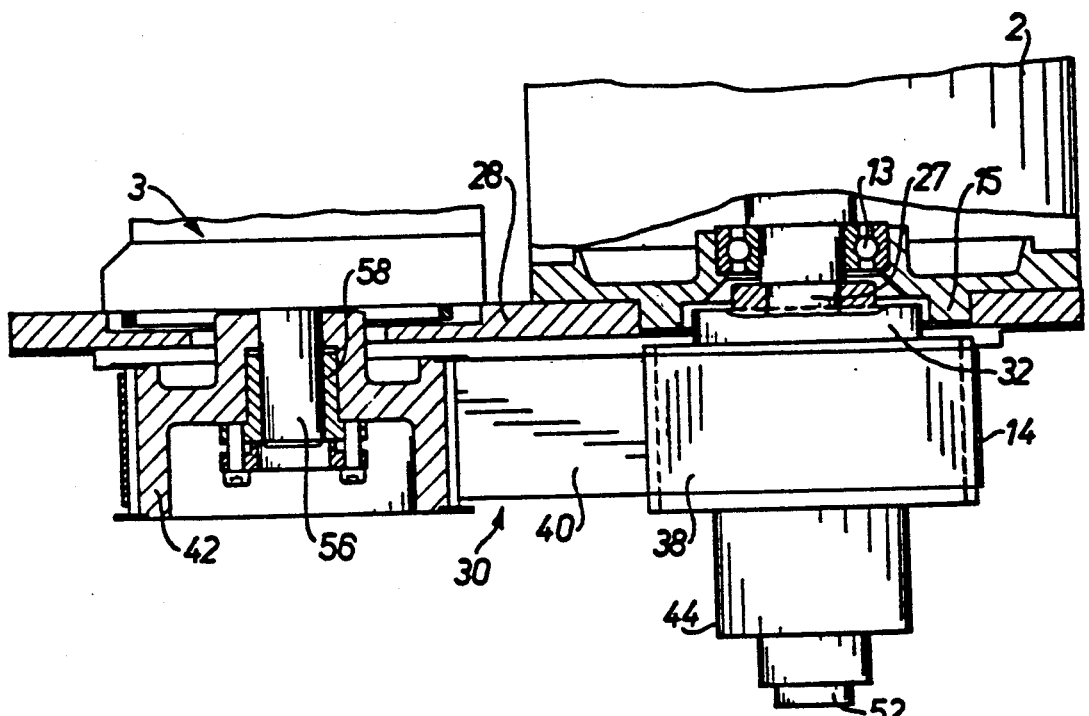
FIG. 2 is a vertical sectional view through the base portion of the cart and illustrating the association of the motor and pump unit with the gearing.
Figure 4:
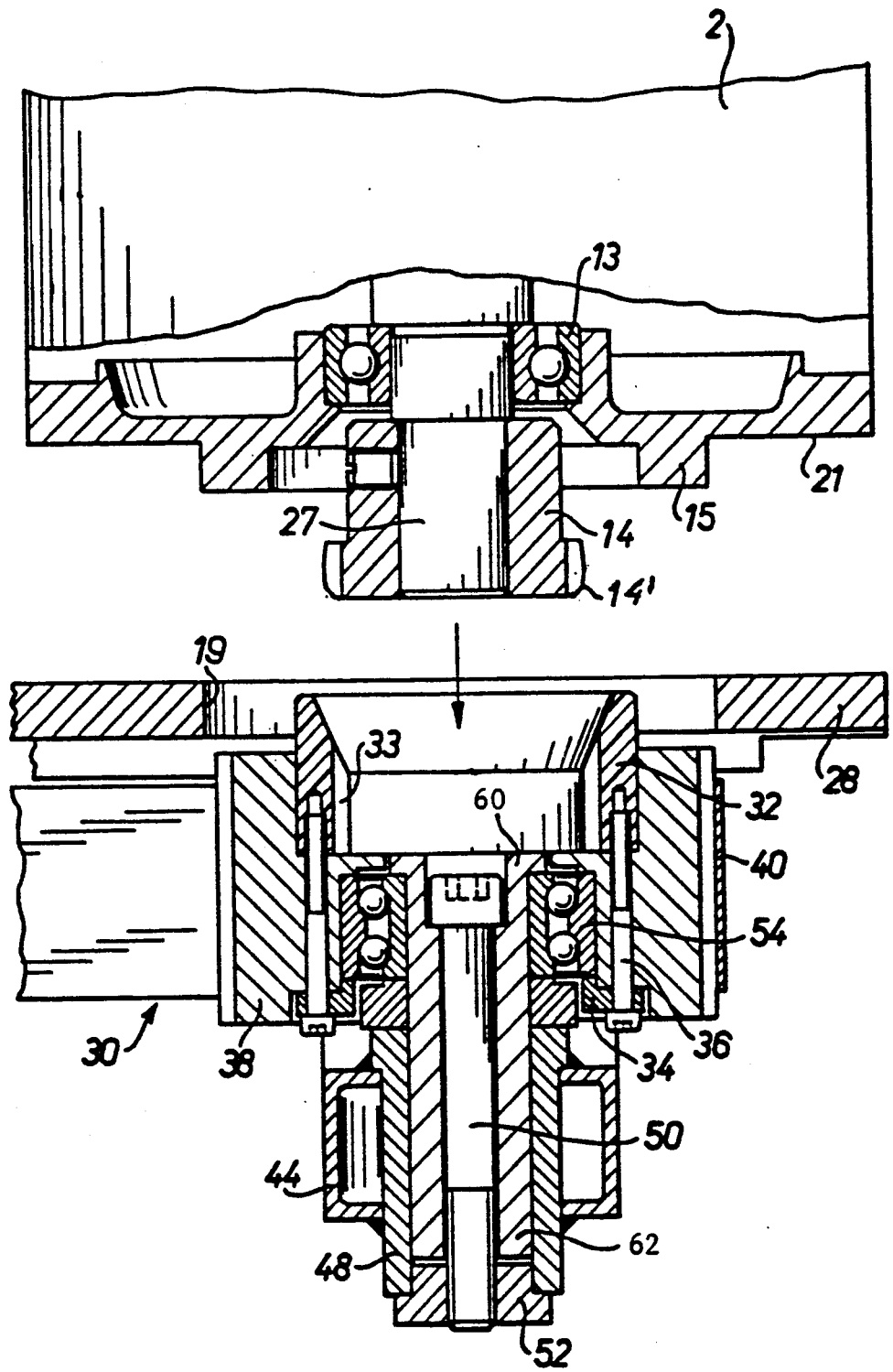
FIG. 4 is an exploded longitudinal sectional view through the quick-release coupling of the motor to the gearing.

In accordance with a feature of the invention, a transmission 30 is located beneath a support and assembly plate 28 on the cart. This arrangement results in a highly compact structure, since it permits placement of the pumps 24, 26 and 17 immediately next to the drive motor 2. As best seen in FIG. 2, a plate 28 is located at the bottom of the cart. The motor 2 and the pumping unit 3 are seated on the plate 28. The motor 2 has an attachment flange which engages into an opening 19 in the attachment plate 28 by an interfitting arrangement provided by a ring-shaped rib 15 to provide for centering of the motor 2 within the opening 19. The lower engagement surface 21 of the motor (FIG. 4) is seated by gravity on the plate 28. The drive shaft 27 need not extend perfectly vertically; it is, however, preferably at least approximately vertical, and, beneath the ball bearing 13, the shaft 27 is coupled to the coupling gear 14. The teeth have an outwardly curved surface, so that an envelope of the gear teeth would be part-spherical, to permit deviation of the shaft 27 from a vertical direction, and still provide for good, low-wear interengagement of the gear 14 with a meshing gear, to be described.

The coupling, in accordance with a feature of the invention, includes a sleeve 32 (FIG. 4) having an inner gearing 33. The inner gearing and the sleeve are made, preferably, of a tough plastic material. A ring disk 34 presses against the lower facing surface of a roller element 38, to provide for rotational coupling between the roller or wheel 38 and the toothed or geared sleeve 32. An endless belt 40, preferably a gear belt, is wrapped about the roller element 38 and then guided about the roller or pulley 42 (FIG. 2) of the pump unit 3. A bushing 48 is welded to a strut 44, forming part of the chassis 5. A bolt 50 passes through the bushing 48, and is screwed at its lower end to a holding disk or nut 52. By tightening the nut 52 and/or the bolt 50, the inner ring of an anti-friction ball bearing 54 is securely clamped in position by engagement with a shoulder 60 of a clamping sleeve 62 located within bushing 48. The outer ring of the ball bearing 54 of course sits in the wheel or pulley 38 which can be formed with external teeth if the belt 40 is a gear belt.

The pump unit 3 has an essentially vertically extending pump shaft 56 (FIG. 2) which is coupled for rotation transmission with the belt roller or pulley 42. A clamping sleeve 58 can be used as a coupling element although any other arrangement is suitable, for example a spline connection. The belt 40 can be tightened by so positioning the pump unit 3 that the pump unit is shifted laterally, that is, about an axis which is eccentric with respect to the drive shaft 56.

The motor 2, which is comparatively heavy, can be removed and access is provided to the handle 18 thereof. To retain the motor in position, the screw 22 is secured to a swing lever 31, which presses against the handle 18 and locates the motor 2 in its operating position, when assembled on the cart. The swing lever 31 is pivotable about a bolt 35 secured in a horizontal frame portion 8 of the chassis.

Figure 3:
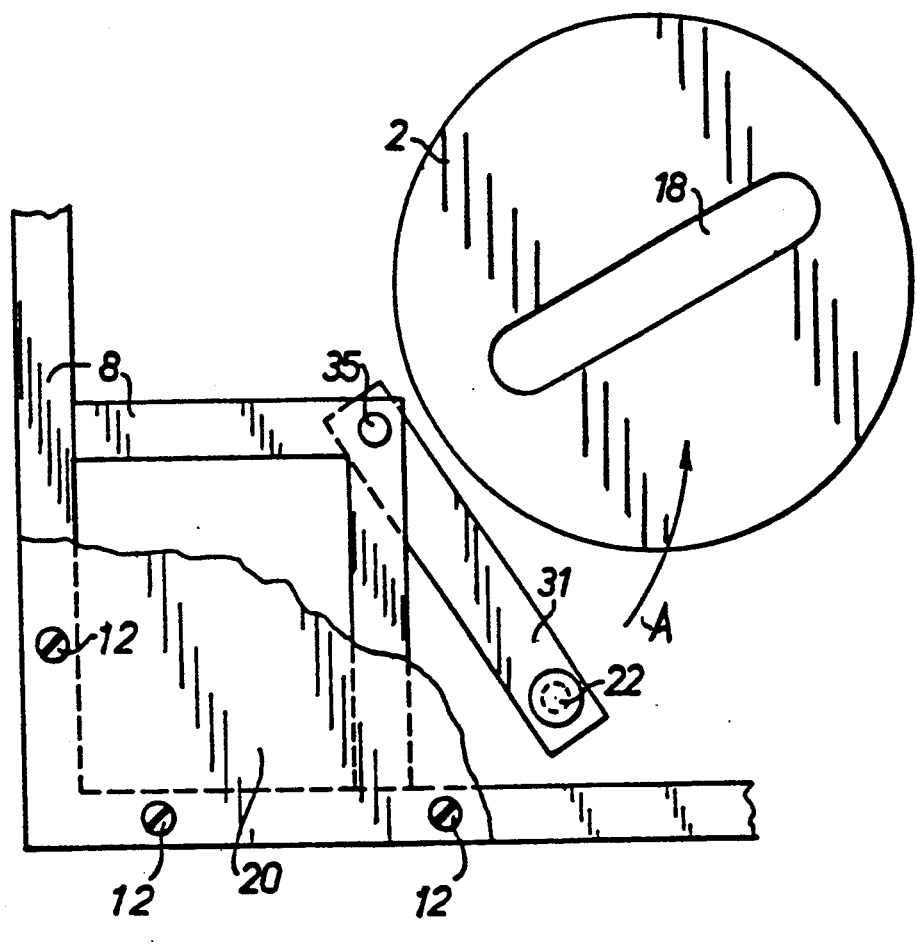
FIG. 3 is a top view of the support elements for the electric motor.

The interengaging coupling parts 14 on motor shaft 27 and the sleeve 32 with gear 33 on the transmission and/or gearing formed by the gear 33 and the belt 40 form a severable coupling. The motor 2, thus, can be released, by hand, by loosening screws 12 (FIG. 3), removal of the top cover 20, and removal of screw 22. This permits swing lever 31 to be moved counter the direction of the arrow A of FIG. 3 into the position shown in FIG. 3, and the motor 2 can then be lifted out of the coupling by the handle 18. No further screws have to be removed to disassemble the motor 2 from the pump and gear unit. Thus, uncoupling and coupling of the motor can be carried out rapidly. The top cover sheet 20 can be secured by quick-release couplings other than by screws 12, permitting fast operation.

A typical motor for use in the cart is about a 13 kW motor. The weight of such a motor, together with a water cooling jacket, may well be one-third, or more, of the overall weight of the entire drive unit. A typical weight of the assembled drive unit, with the motor, is about 138 kg, so that the weight of the drive unit, with the motor removed, will be less than 100 kg. The separated elements, thus, can be transported individually without the use of cranes, hoists, lifts or similar elements and can be positioned manually also at locations in the interior of the building at positions difficult to reach.

The belt 40 can easily be exchanged; it is only necessary to lift the motor 2 out of the coupling 14-32. Any matching required with respect to the transmission relationship can easily be carried out by replacing the roller 38 and/or the roller 42 with rollers of different dimensions.

The transmission need not be a belt transmission, but other transmissions or gearings can be used.

Various changes and modifications may be made within the scope of the inventive concept.

I claim:

1. Hydraulic energy supply cart having
a chassis (5, 8);
at least one hydraulic pump element (3) having a pump shaft (56);
an electric drive motor element (2) having a motor drive shaft (27), and
comprising
separable coupling means (14, 32, 33) having at least two separable parts (14; 32), separably coupling said drive motor element (2) and said pump element (3); and
transmission means (30) rotatably connected to said coupling means interposed between the drive motor element and the pump element,
wherein said drive motor element is essentially vertically positioned on the chassis and said motor drive shaft (27) extends essentially vertically downwardly towards a lower portion of the chassis;
said pump element (3) is located laterally adjacent the drive motor element (2), and said pump shaft (56) extends essentially vertically and essentially parallel to said drive motor shaft (27),
one (2) of said elements (2, 3) is connected to one (32) of said coupling means parts, said transmission means is located below the pump element and said drive motor element and connected to the other of said coupling means parts (32);

means (42, 58) for coupling said transmission means to the other (3) of said elements (2, 3);

a handle (18) coupled to an upper portion of said drive motor element (2);

and releasable clamping means (22) coupling said handle to the chassis (5, 8).

2. The cart of claim 1, wherein said hydraulic pump element (3) comprises three vertically stacked coaxial pumps including two high-pressure pressure fluid pumps (24, 26) and a cooling water pump (17).

3. The cart of claim 1, wherein said releasable clamping means comprises a releasable screw means (22);

and holding frame elements (8, 31) including a movable link (31) engageable by said screw means (22) and selectively movable in position across said handle (18), or out of position of said drive motor element (2) for lifting the drive motor element off said cart.

4. The cart of claim 1, wherein said separable coupling means interconnect and couple together the motor drive shaft (27) and said transmission means (30).

5. The cart of claim 1, wherein said transmission means comprises a belt transmission (30) having first and second drive pulleys (38, 42) of unequal size coupled, respectively, to said pump drive shaft (56) and to said motor drive shaft (27) and a belt (40) connecting said first and second drive pulley;

and wherein said chassis (5, 8) further includes a support and mounting plate (28) extending essentially horizontally on said cart, said first and second drive pulleys having essentially vertical axes of rotation and at least one (38) of said pulleys being rotatably secured to said support and mounting plate (28).

6. The cart of claim 5, wherein said drive motor means (2) is located at the upper side of said support and mounting plate (28);

said belt transmission (30) is located below said support and mounting plate; and support means (44) are provided, secured to said chassis (5, 8) and retaining said at least one drive pulley (38) in position with respect to said support and mounting plate.

7. The cart of claim 1, wherein said chassis includes a support and mounting plate (28) extending essentially horizontally, said support and mounting plate being formed with an opening (19) of predetermined shape and dimension; and wherein said drive motor element (2) is formed with a seating surface (21) fitting against said support and mounting plate, and a locating rim or ridge (15) fitting into said opening, to provide a seat for said drive motor element, and prevent shift of the drive motor element upon energization thereof, while retaining said drive motor element in position in said opening, and by the weight of the drive motor element bearing against said support and mounting plate (28).

8. The cart of claim 7, further including positioning means (8, 31, 22, 18) releasably coupled to said drive motor element (2) at an axial end position of said drive motor means opposite said support and mounting plate (28).

9. The cart of claim 1, wherein said separable coupling means (14, 32, 33) comprises an external gear element (14) coupled to one of said shafts (27, 56);

and an internal gear means (32, 33) coupled to said transmission means (30).

10. The cart of claim 9, wherein said external gear element is coupled to said motor drive shaft (27); and wherein said transmission means includes a transmission wheel (38) having said internal gear means (33) coupled thereto, for releasable interengagement with said external gear element.

11. The cart of claim 10, wherein said external gear element has external gear teeth (14') which are axially curved.

12. Hydraulic energy supply cart comprising a chassis (5, 8), including a support and mounting plate (28) extending essentially horizontally on said cart;

at least one hydraulic pump element (3) having a pump shaft (56);

an electric drive motor element (2) having a motor drive shaft (27), said drive motor element being essentially vertically positioned on the chassis and laterally adjacent the pump element (3), said motor drive shaft (27) extending essentially vertically downwardly towards a lower portion of the chassis, and essentially parallel to said pump shaft;

separable coupling means (14, 32, 33) having at least two separable parts (14, 32), separably coupling said drive motor element (2) and said pump element (3);

transmission means (30) rotatably connected to said coupling means interposed between the drive motor element (2) and the pump element (3), said separable coupling means interconnecting and coupling together the drive motor shaft (27) and said transmission means (30), said transmission means including a belt transmission (30) having first and second drive pulleys (38, 42) of unequal size coupled, respectively, to said pump drive shaft (56) and to said motor drive shaft (27) and a belt (40) connecting said first and second drive pulley, said first and second drive pulleys having essentially vertical axes of rotation and at least one (38) of said pulleys being rotatably secured to said support and mounting plate (28);

said drive motor means (2) being located at the upper side of said support and mounting plate (28) and said belt transmission (30) being located below said support and mounting plate;

support means (44) positioned below said mounting plate (28) and retaining said at least one drive pulley (38) in position with respect to said support and mounting plate (28);

clamping means (22) engageable against the drive motor element and exerting a pressure on said motor in a direction towards said support and mounting plate (28);

and positioning means (8,31,18) releasably coupled to said clamping means (22) and located at an axial end position of said drive motor element (2) opposite said support and mounting plate (28) for selective positioning of said clamping means in line with said drive motor element, or out-of-alignment, to permit lifting the drive motor element off said mounting plate and hence said cart in a vertical direction.

13. The cart of claim 12, wherein said hydraulic pump element (3) comprises three vertically stacked coaxial pumps including two high-pressure pressure fluid pumps (24, 26) and a cooling water pump (17).

14. The cart of claim 12, wherein said clamping means comprises a releasable screw means (22), said releasable screw means being selectively engageable against the drive motor element for exerting said pressure on said drive motor element (2) towards said support and mounting plate (28).

15. The cart of claim 12, wherein said drive motor element (2) is formed with a seating surface (21) fitting against said support and mounting plate (28);

a locator rim or ridge (15) secured to said mounting plate to provide a seat for said drive motor element, and prevent shift of the drive motor element upon energization thereof, while retaining said drive motor element in position thereon, the weight of the drive motor element bearing against said support and mounting plate (28) and said clamping means additionally exerting, selectively, pressure towards said support and mounting plate (28).

* * * * *